United States Patent [19]

Kupiec et al.

[11] Patent Number: 5,918,240
[45] Date of Patent: *Jun. 29, 1999

[54] AUTOMATIC METHOD OF EXTRACTING SUMMARIZATION USING FEATURE PROBABILITIES

[75] Inventors: Julian M. Kupiec, Cupertino; Jan O. Pedersen, Palo Alto; Francine R. Chen, San Mateo; Daniel C. Brotsky, Berkeley; Steven B. Putz, Santa Clara, all of Calif.

[73] Assignee: Xerox Corporation, Stamford, Conn.

[ * ] Notice: This patent is subject to a terminal disclaimer.

[21] Appl. No.: 08/495,986

[22] Filed: Jun. 28, 1995

[51] Int. Cl.$^6$ ............................................. G06F 17/21
[52] U.S. Cl. ....................................................... 707/531
[58] Field of Search .................................. 395/793, 752, 395/759; 382/203, 224, 173; 707/531; 704/2, 9

[56] References Cited

U.S. PATENT DOCUMENTS

| | | | |
|---|---|---|---|
| 4,965,763 | 10/1990 | Zamora | 364/900 |
| 5,077,668 | 12/1991 | Doi | 364/419 |
| 5,251,131 | 10/1993 | Masand et al. | 364/419.8 |
| 5,257,186 | 10/1993 | Ukita et al. | 364/419.1 |
| 5,297,027 | 3/1994 | Morimoto et al. | 364/419.19 |
| 5,384,703 | 1/1995 | Withgott et al. | 364/419.19 |
| 5,495,349 | 2/1996 | Ikeda | 358/518 |

FOREIGN PATENT DOCUMENTS

| | | |
|---|---|---|
| 0 544 432 A2 | 6/1993 | European Pat. Off. . |
| 2257266 | 10/1990 | Japan . |

OTHER PUBLICATIONS

Chris D. Paice, "Constructing Literature Abstracts by Computer: Techniques and Prospects", Information Processing and Management, vol. 26, No. 1, 1990, UK, pp. 171–186, 1990.

Cheong, T.L., and T.S. Lip. "A Statistical Approach to Automatic Text Extraction," Institute of Systems Science; Asian Library Journal, pp. 1–8.

Jones, R.L.. "AIDA the Artificially Intelligent Document Analyzer" McDonald, D. and J. Weckert ed. Libraries and Expert Systems. Proceedings of a Conference and Workshop, pp. 49–57; Jul. 1990; Riverina, Australia.

Jones, R.L.. and D. Corbett. "Automatic Document Content Analysis: The AIDA Project" Library Hi Tech, vol. 10, No. 1–2, pp. 111–117.

Luhn, H.P. "The Automatic Creation of Literature Abstracts" IBM Journal of Research and Development, vol. 2, No. 2; pp. 159–162; 1958.

Luhn, H.P. "A Business Intelligence System" IBM Journal of Research and Development, vol. 2, No. 4; pp. 314–319, 1958.

Paice, C.D. and P.A. Jones. "The Identification of Important Concepts in Highly Structured Technical Papers" *ACM SIGIR Conference*, Jun. 27, 1993. Pittsburgh,PA. pp. 69–78.

(List continued on next page.)

*Primary Examiner*—Gail O. Hayes
*Assistant Examiner*—Barton L. Bainbridge
*Attorney, Agent, or Firm*—Tracy L. Hurt

[57] ABSTRACT

A method of automatically generating document extracts. The method makes use of feature value probabilities generated from a statistical analysis of manually generated summaries to extract the same set of sentences an expert might. The method is based upon an iterative approach. First, the computer system designates a sentence of the document as a selected sentence. Second, the computer system determine values for the selected sentence of each feature of a feature set. Third, the computer system increases a score for the selected sentence based upon the value of the feature for the selected sentence and upon the probability associated with that value. Fourth, after scoring all of the sentences of the document the computer system, the computer system selects a subset of the highest scoring sentences to be extracted.

7 Claims, 14 Drawing Sheets

OTHER PUBLICATIONS

Julian Kupiec, Jan Pederson and Francine Chen, "A Trainable Document Summarizer", 18th. *International ACM SIGIR Conference on Research and Development in Information Retrieval*, Jul. 9–Jul. 13, 1995, Seattle, Washington, pp. 68–73, XP00602689.

"Method for Automatic Extraction of Relevant Sentences from Texts", *IBM Technical Disclosure Bulletin*, vol. 33, No. 6A, Nov. 1990, New York, pp. 338–339, XP002015802.

Chris D. Paice, "Constructing Literature Abstracts By Computer: Techniques and Prospects", *Information Processing and Management*, vol. 26, No. 1, 1990, UK, pp. 171–186, XP00605124.

European Search Report cited Oct. 14, 1996 for counterpart EPC application 96304778.

The work undertaken examines the drawability of steel wire rod with respect to elements that are not intentionally added to steel. Only low carbon steels were selected for experimentation. During wire drawing, failure-inducing tensile forces are greatest at the center of the wire. This accounts for the classic appearance of ductile failure with the center of the wire failing in a ductile manner.

FIG. 8

Paragraph 2: The work undertaken examines the drawability of steel wire rod with respect to elements that are not intentionally added to steel. The effect of microstructure was not of interest to the investigation. For this reason, only low carbon steels were selected for experimentation.

....

Paragraph 4: Once nucleated, these microvoids grow and coalesce, until the wire can no longer support the drawing load and a break occurs. During wiredrawing, failure-inducing tensile forces are greatest at the center of the wire. This accounts for the classic appearance of ductile failure with the center of the wire failing in a ductile manner, while the circumference fails last, and in shear.

*FIG. 9*

Sentence Extracts:

- Drawability of low carbon steel wire

- The work undertaken examines the drawability of steel wire rod with respect to elements that are not intentionally added to steel.

- For this reason, only low carbon steels were selected for experimentation.

- During wiredrawing, failure-inducing tensile forces are greatest at the center of the wire.

- This accounts for the classic appearance of ductile failure with the center of the wire failing in a ductile manner, while the circumference fails last, and in shear.

*FIG. 10*

AUTOMATIC METHOD OF EXTRACTING SUMMARIZATION USING FEATURE PROBABILITIES

FIELD OF THE INVENTION

The present invention relates to a method of automatic text processing. In particular, the present invention relates to an automatic method of generating summary extracts from natural language text using feature probabilities.

BACKGROUND OF THE INVENTION

Summaries and extracts provide a concise document description more revealing than a document title, yet brief enough to be absorbed in a single glance. The desirability of summaries and extracts is increased by the large quantity of on-line, machine readable, information currently available.

Traditional author-supplied indicative abstracts, when available, fulfill the need for a concise document description. The absence of author-supplied abstracts can be overcome with automatically generated document summaries. Numerous researchers have addressed automatic document summarization. The nominal task of generating a coherent narrative summarizing a document is currently considered too problematic because it encompasses discourse understanding, abstraction, and language generation. A simpler approach avoids the central difficulties of language understanding by defining document summarization as summary by extraction. That is to say, the goal of this approach is to find a subset of sentences of a document that are indicative of document content. Typically, under this approach document sentences are scored and the highest scoring sentences are selected for extraction.

Numerous heuristics have been proposed to score sentences for extracting summarization. Existing evidence suggests that combinations of features yield the best performance. At least one prior extracting summarizer uses multiple features, which are weighted manually by subjective estimation. Manually assigning feature weights to obtain optimal performance is difficult when many features are used.

Prior features used for extracting summarization include frequency-keyword heuristics, location heuristics, and cue words. Frequency-keyword heuristics use common content words as indicators of the main document theme. Location heuristics assume that important sentences lie at the beginning and end of a document, in the first and last sentences of paragraphs, and immediately below section headings. Cue words are words that are likely to accompany indicative or informative summary material; e.g. "In summary."

SUMMARY OF THE INVENTION

An object of the present invention is to improve the quality of automatically generated extracts of natural language text.

Another object of the present invention is to combine multiple features together in an extracting summarizer to provide better extracts than possible using just one feature.

A still further object of the present invention is to provide an extracting summarizer whose performance can be objectively evaluated.

An automatic method of extracting a subset of sentences from sentences of a natural language document using a computer system will be described. The method makes use of feature value probabilities generated from a statistical analysis of a document corpus that includes model summaries. These feature probabilities are stored in memory accessible to the computer system. The computer system takes an iterative approach to selecting sentences for extraction. First, the computer system designates a sentence of the document as a selected sentence. Second, the computer system determine values for the selected sentence of each feature of a feature set. Third, the computer system increases a score for the selected sentence based upon the value of the feature for the selected sentence and upon the probability associated with that value. Fourth, after scoring all of the sentences of the document, the computer system selects a subset of the highest scoring sentences to be extracted and these are presented to a user of the computer system.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

FIG. 8 shows a manually generated summary for a document.

FIG. 9 shows relevant paragraphs of the document associated with the summary of FIG. 8.

FIG. 10 shows the sentences automatically extracted from the document of FIG. 9.

DETAILED DESCRIPTION OF THE PREFERRED EMBODIMENTS

Figure 1:
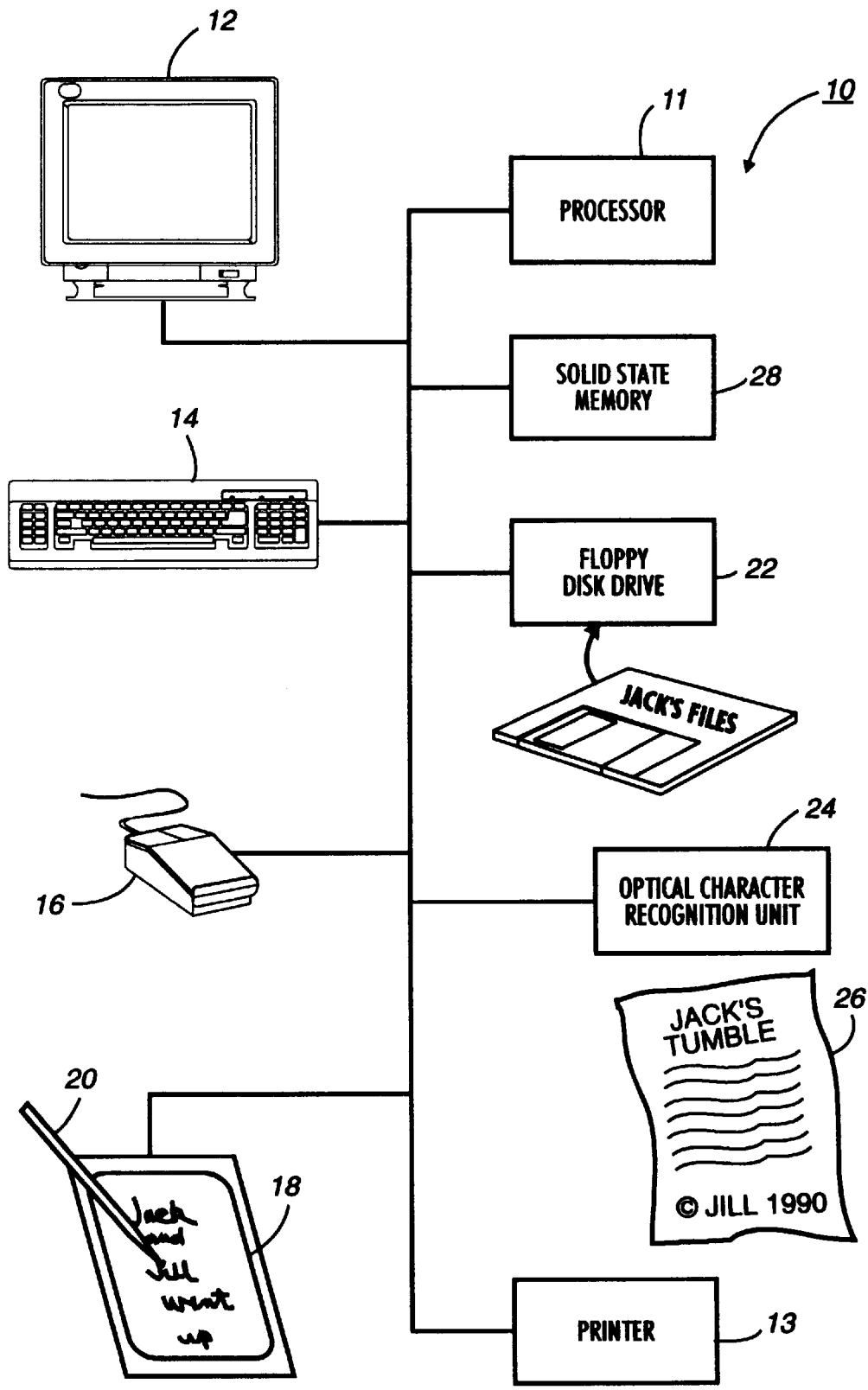
FIG. 1 illustrates a computer system for automatically extracting summary sentences from natural language documents.

FIG. 1 illustrates in block diagram form computer system 10 in which the present method is implemented. The present method alters the operation of computer system 10, allowing it to extract from a machine readable natural language document the same set of sentences that an expert might. Computer system 10 determines which sentences of a document to extract using feature probabilities obtained from a statistical analysis of a corpus of documents, each having an associated summary manually generated by an expert. These probabilities allow computer system 10 to select sentences to be extracted from a document using a probabilistically based function of multiple features and independent evaluation of those features on each sentence.

Bayes' rule underlies both the present method and automatic extracting summarization. According to Bayes' rule the probability of a sentence s being included in a summary S given a set k of sentence characteristics, called features, $F_j$; j=1,2, ... k, can be expressed mathematically as:

$$P(s \in S | F_1, F_2, ... F_k) = \frac{P(F_1, F_2, ... F_k | s \in S) P(s \in S)}{P(F_1, F_2, ... F_k)}$$

Assuming statistical independence of the features, the probability of a sentence s being included in a summary S can be reformulated as:

$$P(s \in S | F_1, F_2, ... F_k) = \prod_{j=1}^{k} \frac{P(F_j | s \in S) P(s \in S)}{\prod_{j=1}^{k} P(F_j)}$$

That is to say that, the overall probability of a sentence s being included in a summary S is proportional to the product of the probabilities provided by each feature evaluated individually on sentence s. The method of training to be described takes advantage of this fact to generate probabilities for a set of features from a training corpus with matched manually generated summaries. Computer system 10 determines the probability of observing a value for a feature j in a sentence of the summary; i.e., $P(F_j | s \in S)$, and the probability of a feature j taking the observed value, $P(F_j)$, simply by counting occurrences of these values within the training corpus. After training, computer system 10 uses the probabilities to automatically extract the same set of sentences from a document that an expert might. A method of doing so will also be described in detail herein.

I. Computer System for Automatic Extracting Summarization

Prior to a more detailed discussion of either training or sentence extraction, consider computer system 10. Computer system 10 includes monitor 12 for visually displaying information to a computer user. Computer system 10 also outputs information to the computer user via printer 13. Computer system 10 provides the computer user multiple avenues to input data. Keyboard 14 allows the computer user to input data to computer system 10 manually. By moving mouse 16 the computer user is able to move a pointer displayed on monitor 12. The computer user may also input information to computer system 10 by writing on electronic tablet 18 with pen 20. Alternately, the computer user can input data stored on a machine readable medium, such as a floppy disk, by inserting disk 23 into floppy disk drive 22. Optical character recognition unit (OCR unit) 24 permits the computer user to input hardcopy natural language document 26, which OCR unit 24 then converts into a coded electronic representation, typically American National Standard Code for Information Interchange (ASCII).

Processor 11 controls and coordinates the operations of computer system 10 to execute the commands of the computer user. Processor 11 determines and takes the appropriate action in response to each user command by executing instructions stored electronically in memory, either memory 25 or on a floppy disk within disk drive 22. Typically, operating instructions for processor 11 are stored in solid state memory 25, allowing frequent and rapid access to the instructions. Semiconductor memory devices that can be used include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

II. Features

A. Feature Description

Computer system 10 uses sentence characteristics, known as features, to automatically extract sentences likely to be selected for inclusion in a manually generated summary. Preferably, computer system 10 uses five features to generate document extracts, although a lesser or greater number may also be used. Preferably, the five features used are: sentence length, cue words, sentence location, upper case sentences, and direct theme sentences. Performance varies depending upon the combination of features used.

The sentence length feature indicates whether the number of words in a sentence meets or exceeds a minimum length. The minimum length is selected to identify short sentences, like section headings, which are not often included in manually generated summaries. In the preferred embodiment the minimum length required for the sentence length feature to be true is six words. Sentences of five or fewer words in length have a sentence length feature value of false in the preferred embodiment.

The direct theme feature indicates whether a sentence addresses one of the main themes of a document. The direct theme feature uses the intuition that content words frequently used within a document are likely to be indicative of that document's theme. A method of identifying such sentences will be described in detail below. The value of the direct theme feature indicates whether a sentence is one of the document's direct theme sentences. A sentence that has been identified as a direct theme sentence will have a direct theme feature value of true. Analogously, a sentence that has not been identified as a direct theme sentence will have a direct theme feature value of false.

The upper case feature indicates whether a sentence includes important proper names or acronyms, which are frequently included within manually generated summaries. The feature is so named because proper names and acronyms are typically presented using upper case letters, regardless of their position within a sentence. A method of identifying upper case feature sentences will be described in detail below. A sentence that has been identified as an upper case sentence will have an upper case feature value of true. Analogously, a sentence that has not been identified as an upper case sentence will have an upper case feature value of false.

The cue word feature indicates whether a sentence includes word sequences that indicate it summarizes the document. Such word sequences include:

this article, the article,this investigation, present investigation, this paper,this study, this work, present work, this letter,in conclusion, is concluded, conclude that, we conclude, in summary,the results, our results, results show, results indicate, results are.

This list of cue words is not intended to be exhaustive. Other word sequences may indicate that a sentence summarizes document content and may be used in conjunction with the methods described herein.

Methods of identifying sentences including cue words will not be described in detail herein because a method for doing so will be obvious to those of ordinary skill. Sentences including cue words have a cue word feature value of true, and those not including cue words have a false value.

The location feature indicates whether the location of a sentence within a document is such that it is likely to be included in a summary. Sentences located at the beginnings and ends of paragraphs are more likely to be included in a manually generated summary than sentences in the middle of a paragraph. Further, sentences at the beginning or end of a document are more likely to be included in a short summary than sentences in the middle of a document. In the preferred embodiment, the beginning of a document is defined as the first five paragraphs after start of text, the end is defined as the last five paragraphs of a document, and the middle includes all other paragraphs. Additionally, the beginning of a paragraph is defined as the first sentence, the end as the last sentence of the paragraph, and the middle includes all other sentences within a paragraph. Thus, unlike the other features used, the location feature can take more than two values.

B. Feature Evaluation

The tokenizer used during training and extracting summarization facilitates valuation of the features described above. A tokenizer analyzes the machine readable representation of a natural language document and identifies paragraph boundaries, sentence boundaries, and the words within each sentence. Preferably, the tokenizer generates a sentence structure for each sentence of a document that includes three pieces of information useful to feature valuation: a sentence I.D., sentence position, and sentence length. The sentence I.D. is a unique number indicating the location of a sentence with respect to the start of the document. The sentence position indicates the position of the sentence within its paragraph. The sentence length represents the number of words included in the sentence, which facilitates quick evaluation of the sentence length feature.

Methods of evaluating the selected set of features will be discussed below a feature at a time. There is no reason feature evaluation need be done a feature a time, however, and approaches for evaluating multiple features at a time will be discussed below.

B.1. Evaluation of the Location Feature

Evaluation of the location feature is straightforward if a sentence location within the main body of text is known. Preferably, the sentence position and a paragraph number are used to indicate sentence location. The paragraph number indicates the location within the document of the sentence's paragraph. Given both the sentence position and paragraph number of a sentence the location feature can be easily evaluated. Thus, evaluation of the location feature given sentence positions and paragraphs numbers need not be described in detail herein.

What requires discussion is obtaining the sentence numbers and paragraphs numbers necessary for evaluating the paragraph feature. That task involves identifying the beginning of the main body of text, and an author supplied title or abstract, if present, because these are often preceded by dates, addresses, names and other notations that are not pertinent to a document extract.

Figure 2:
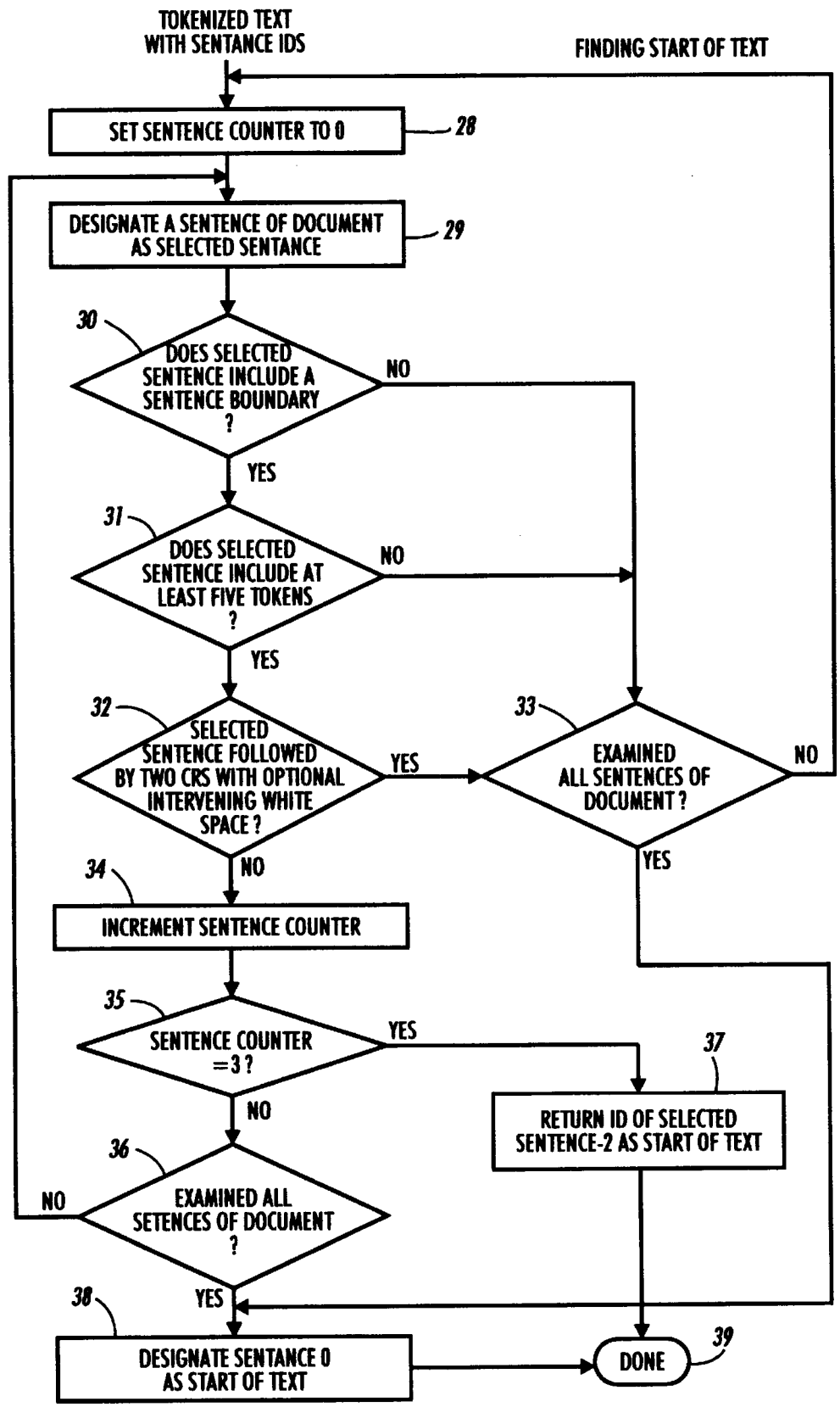
FIG. 2 is a flow diagram of a method of locating the start of text within a document.

FIG. 2 illustrates in flow diagram instructions 27 for identifying the starting sentence of the main body of text, from which sentence numbers and paragraph numbers can be easily deter mined. Briefly described, instructions 27 direct processor 11 to search for the first paragraph at least a minimum number of sentences in length, each sentence including at least some minimum number of words and ending with punctuation. Instructions 27 identify the start of that paragraph as the start of the main body of text of a document. If processor 11 cannot identify such a paragraph, then the first sentence of the document is treated as the start of the main body of text. Instructions 27 may be stored in machine readable form in solid state memory 25 or on a floppy disk placed within floppy disk drive 22. Instructions 27 may be realized in any computer language, including LISP and C++.

Processor 11 begins execution of instructions 27 with step 28, during which step a sentence counter is initialized to zero. Processor 11 uses the sentence counter to track how many consecutive sentences greater than the minimum length have been located. The counter initialized, processor 11 exits step 28 and branches to step 29.

Processor 11 designates one of the sentences of the selected document as the selected sentence during step 29. Preferably, processor 11 first designates as the selected sentence the first sentence of the document and thereafter designates sentences sequentially until the beginning of the main body of text has been located or the end of the document reached. Processor 11 branches from step 29 to step 30, ready to begin the search for the start of the main body of text.

During step 30 processor 11 performs the first of its tests to identify whether the selected sentence forms part of the first paragraph of the main body of the text. Processor 11 searches the tokens of the selected sentence for a sentence boundary; i.e., terminating punctuation. Frequently, notation preceding the main body of text is not punctuated, thus processor 11 does not consider the selected sentence part of the main text body if it lacks a sentence boundary. Upon discovery that the selected sentence lacks a sentence boundary, processor 11 exits step 30 and advances to step 33. Discussion of the activities during step 33 will be deferred. On the other hand, if the selected sentence includes a sentence boundary then the selected sentence may form part of the first paragraph of the main text body. To investigate that possibility further processor 11 branches to step 31 from step 30.

During step 31 processor 11 performs the second test to determine whether the selected sentence forms part of the first paragraph of the main text body. Processor 11 determines whether the selected sentence is at least a minimum number of words in length, excluding punctuation. Frequently, notations preceding the main text body are brief. Thus, processor 11 does not consider the first few brief sentences of the document part of the main text body. In the preferred embodiment, processor 11 considers any sentence less than five words in length not part of the first paragraph of the main text body. If the selected sentence is too brief, processor 11 exits step 31 and advances to step 33. As before, discussion of step 33 will be deferred. Conversely, if the length of the selected sentence meets or exceeds the minimum length, processor 11 branches to step 32.

Entry of step 32 means that the selected sentence may form part of the first paragraph of the main text body. Processor 11 performs one last test of the selected sentence during step 32. Processor 11 determines whether the selected sentence is separated from the next sentence by a paragraph boundary, or if paragraph boundaries are not indicated, by indentation or by two carriage returns separated by optional intervening white space. This separation between the selected sentence and the next sentences indicates they are not part of the same paragraph. If the two sentences belong to different paragraphs, processor 11 has not found the first paragraph of the main text body. In that case, processor 11 branches to step 33 from step 32. Activities during step 33 will be discussed later. On the other hand, if the selected sentence and the next sentence belong to the same paragraph, processor 11 may have identified one of the sentences of the first paragraph of the main text body. In response to that possibility processor 11 proceeds to step 34 and increments the sentence counter.

Having just increased the sentence counter, processor 11 determines during step 35 whether it has discovered yet the minimum number of minimum length consecutive sentences. In the preferred embodiment, processor 11 makes this decision by comparing the sentence counter to three. If the sentence counter has a value less than three, processor 11 has not yet identified the first paragraph. To determine whether further evaluation of the current paragraph may be possible processor 11 advances to step 36. Discussion of step 36 will be deferred until later. On the other hand, when the sentence counter equals the minimum number, processor has located the first paragraph of the main text body. In response to that discovery, processor 11 proceeds to step 37 from step 35.

During step 37 processor 11 identifies as the first sentence of the main text body the sentence whose sentence I.D. is two less than that of the selected sentence. Having identified the first sentence of the first paragraph of the main text body, sentence positions and paragraph numbers for the main body of text can be easily determined, which in turn permits easy evaluation of the location feature for all sentences of the document. Processor 11 branches to step 39 from step 37, the current task complete.

Consider now the previously deferred discussion of activities upon entry to steps 33 and 36. Entry of either step means that processor 11 has not yet discovered the first paragraph of the main text body. During both steps processor 11 determines whether it can continue searching for that first paragraph by asking whether all sentences of the selected document have been examined. Response of processor 11 to the discovery that all sentences have not yet been examined differs between the two steps because different events dictate entry to steps 33 and 36. Processor 11 branches to step 33 whenever the selected sentence is not believed to form part of the first paragraph of the main text body, for whatever reason. As a result, if the document includes sentences not yet examined, the concern of processor 11 is to identify a set of consecutive sentences of minimum length in one paragraph that does not include the selected sentence. Thus, processor 11 branches from step 33 to step 28 and reinitializes the sentence counter. Execution of instructions 27 proceeds in the manner previously discussed. In contrast, entry to step 36 means that the selected sentence may form part of a set of consecutive sentences of minimum length in a single paragraph. Thus, when the document includes sentences subsequent to the selected sentence, processor 11 branches to step 29 from step 36 to search for other minimum length sentences in the same paragraph as the selected sentence. Execution of instructions 27 from that point proceeds in the manner discussed previously.

If processor 11 determines during step 33 or 36 that all sentences have been examined but three consecutive sentences with terminating punctuation in a single paragraph have not been found, processor 11 advances to step 38. During step 38 processor 11 identifies the first sentence of the document as the first sentence of the first paragraph of the main text body. Processor 11 then advances to step 39, its current task complete.

B.2. Evaluation of the Direct Theme Feature

Figure 3:
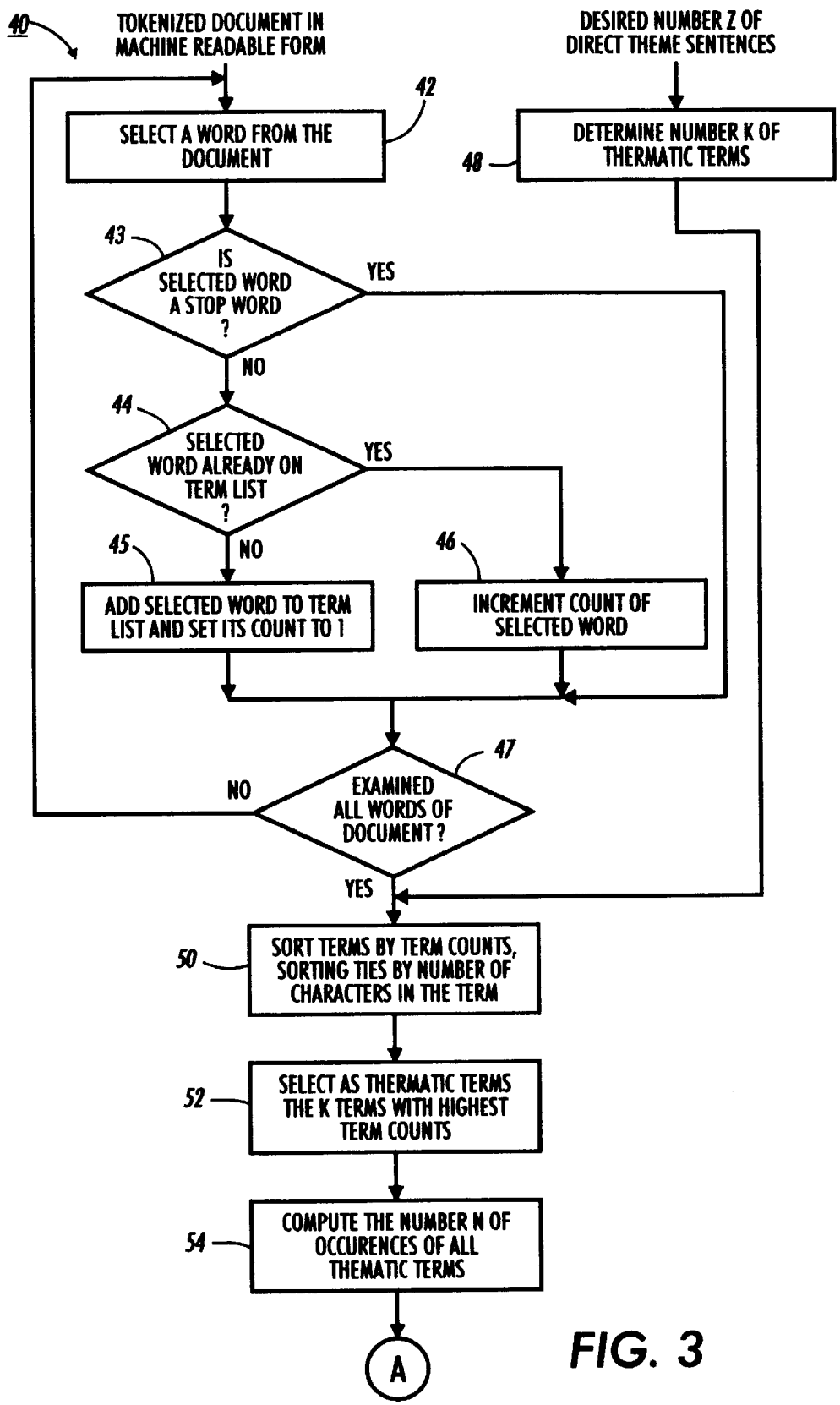
FIG. 3 is a flow diagram of a method of generating a thematic summary of a document using the computer system of FIG. 1.
Figure 3:
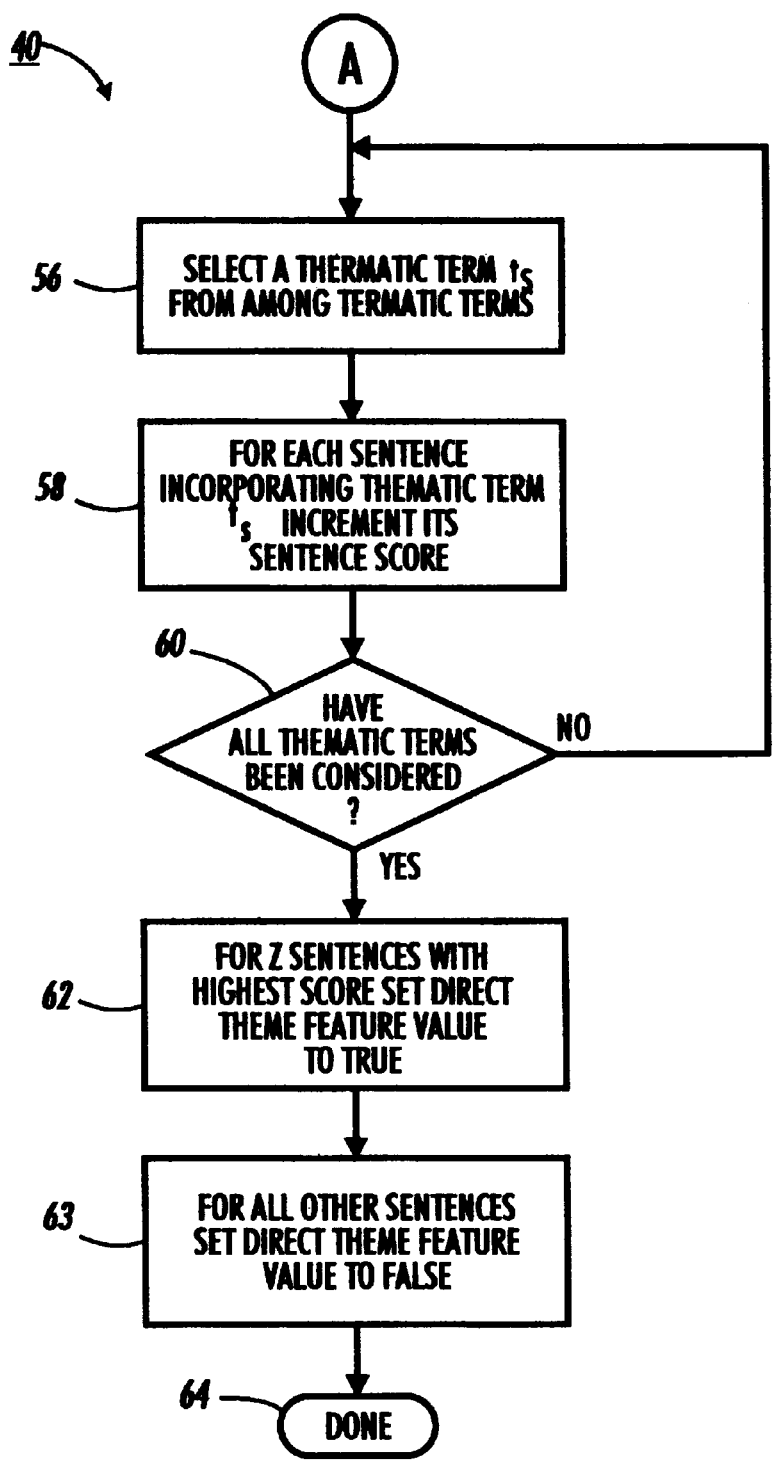

FIG. 3 illustrates in flow diagram form instructions 40 executed by processor 11 to evaluate the direct theme feature for each sentence of a document, regardless of whether direct theme evaluation is performed during training or extracting summarization. Instructions 40 may be stored in machine readable form in solid state memory 25 or on a floppy disk placed within floppy disk drive 22. Instructions 40 may be realized in any computer language, including LISP and C++. Briefly described, processor 11 begins its selection of direct theme sentences by first generating a list of terms used in the document, excluding stop words and counting the number of times each word is used. This task is accomplished during steps 42, 43, 44, 45, 46, and 47. Processor 11 then uses the term list to identify the most frequent and longest terms, called thematic terms during steps 50 and 52. Subsequently, during steps 56, 58, and 60 processor 11 generates a score for each sentence including a thematic term. Processor 11 selects a subset of the highest scoring sentences during step 63 and sets to true their direct theme feature.

Given that brief description, let us now consider instructions 40 in detail. If desired, prior to initiating execution of instructions 40 the computer user may also change the number, denoted "Z", of sentences selected as direct theme sentences from the default number. The default number may be set to any arbitrary number of sentences. In an embodiment intended for document browsing, the default number is set to ten sentences.

Processor 11 responds to the input of a tokenized, machine readable, document by branching to step 42. With this step processor 11 begins efforts to build a list of terms included in the document by selecting a word from the document. That done, processor 11 branches from step 42 to step 43.

During step 43 processor 11 compares the selected word to a list of stop words. As used herein, "stop words" are words that do not convey thematic meaning and occur very frequently in natural language text. Most pronouns, prepositions, abbreviations, determiners, and conjugations of the infinitive of the verb "to be" are classified as stop words. Thus, for example, English words such as "and, a, the, on, by, about, he, she, be, am, were" are stop words. Stop words within the document are identified by comparing the word tokens for the document to a list of stop words. If the selected word is a stop word, processor 11 advances to step 47. On the other had, when the selected word is not a stop word, processor 11 branches from step 43 to step 44.

During step 44 processor 11 compares the selected word to the terms already included in a term index—a data structure associating words of the document with the location of every occurrence of that term. If the selected word is not yet included in the index, then processor 11 branches to step 45 and adds an entry to the term index for the selected word. Each term index entry includes the term itself, a counter indicating how many times the term has occurred in the document, and sentence I.D.s corresponding to the sentence in which each term occurs. Thus, for example, a new index entry for the term "apostacy" of "apostacy, 1, 17" indicates that the term apostacy has occurred once in sentence 17 of the document. On the other hand, if an index entry already exists for the selected word, then processor 11 branches from step 43 to step 46. During step 46 processor 11 locates the term index entry for the selected word, increments the term count, and adds the sentence I.D. for the selected word to the index entry. Thus, for example, if the selected word was "apostacy," which had occurred once previously, then the index entry would become "apostacy, 2, 17, 17," indicating that the term occurs twice in sentence 17.

Having modified the term index in response to the selected word during step 45 or 46, processor 11 advances to step 47. Processor 11 then determines whether all words in the document have been examined yet. If not, processor 11 has not completed the term index. In response, processor 11 returns to step 42 and continues building the term list in the manner described. On the other hand, if every word of the document has been examined, then the term index is complete and processor 11 can turn its attention to other tasks. In this case, processor 11 branches to step 50.

After initiation of execution and prior to execution of step 50, during step 48, processor 11 determines the number of thematic terms to be used in selecting thematic sentences. That umber, denoted "K", is determined based upon the number of sentences to be selected as direct theme sentences; i.e., based upon Z. In general, K should be less than Z and greater than 1. Requiring K be less than Z insures some commonality of theme between selected thematic sentences. Preferably, K is determined according to the equation:

$$K = \begin{cases} Z \times c_1 & \text{if } S \times c_1 > 3 \\ 3 & \text{otherwise;} \end{cases}$$

where:

$c_1$ is a constant whose value is less than 1;

Z is the number of sentences in the thematic summary; and

K is the number of thematic terms.

In one embodiment, the value of $c_1$ is set equal to 0.7.

Armed with a value for K and the term counts generated during step 46, processor 11 begins the process of selecting K thematic terms. During step 50, processor 11 sorts the terms of the term index according to their counts; i.e., the total number of occurrences of each term in the document. Ties between two terms having the same count are preferably broken in favor of the term including the greatest number of characters, and if that fails, arbitrarily. Having generated a sorted term index and stored the index in memory, processor 11 branches from step 50 to step 52. During step 52 processor 11 selects from the sorted term index the K terms with the highest counts. That done, processor 11 advances to step 54.

During step 54 processor 11 computes the total number of occurrences of the K thematic terms in the document. That number, denoted "N", is calculated by summing the counts of the K thematic terms. Processor 11 branches to step 56 from step 54.

Having selected the thematic terms and determined their counts, processor 11 is ready to begin evaluating the thematic content of the sentences of the document. During steps 56, 58, 60, and 62, processor 11 considers only those sentences that include at least one of the K thematic terms, which is easily done given the information included in the term index. Processor 11 does so by examining the K highest scoring terms of the sorted term index. After selecting a term, denoted $t_s$, during step 56, processor 11 examines each sentence I.D. associated with $t_s$ during step 58. For each sentence I.D. associated with $t_s$, processor 11 increments that sentence's score. Preferably, the score for each sentence is incremented by δ, where δ is expressed by the equation:

$\delta = \text{count}_{t_s}(c_2 + \text{freq}_{t_s})$;

where:

$\text{count}_{t_s}$ is the number of occurrences of $t_s$ in the sentence $c_2$ is a constant having a non-zero, positive value; and $\text{freq}_{t_s}$ is the frequency of the selected term $t_s$.

$\text{freq}_{t_s}$ is given by the expression:

$\text{freq}_{t_s} = \text{count}_{t_s}/N$;

where:

N represents the total number of occurrences of thematic terms within the document.

Preferably, $c_2$ is set to a value of one.

Sentence scores can be tracked by generating a sentence score list during step 58. Each time processor 11 selects a sentence I.D. the sentence score list is examined to see if it includes that sentence I.D. If not, the sentence I.D. is added to the sentence score list and its score is increased as appropriate. On the other hand, if the sentence score list already includes the particular sentence I.D., then the score already associated with the sentence is incremented in the manner discussed previously.

After incrementing the scores of all sentences associated with the selected term, $t_s$, processor 11 branches from step 58 to step 60. During step 60 processor 11 determines whether all the thematic terms have been evaluated. If not, processor 11 returns to step 56 to select another thematic term as the selected term. Processor 11 branches through steps 56, 58, and 60 as described previously until all of the thematic terms have been examined. When that event occurs, processor 11 branches to step 62 from step 60.

During step 62 processor 11 selects as the thematic sentences the Z sentences with the highest scores. Processor 11 does this by sorting the sentence score list by score. Having selected the thematic sentences, processor 11 branches to step 63. During step 63 processor 11 sets the direct theme feature for these sentences to true. During the subsequent step, processor 11 sets the direct theme feature for all other sentences within the document to false. Preferably, the direct theme feature value for each sentence is associated with its sentence structure to speed generation of feature probabilities and the extraction of summary sentences. Afterward, processor 11 branches to step 64 from step 63.

B.3. Evaluation of the Upper Case Feature

Figure 4:
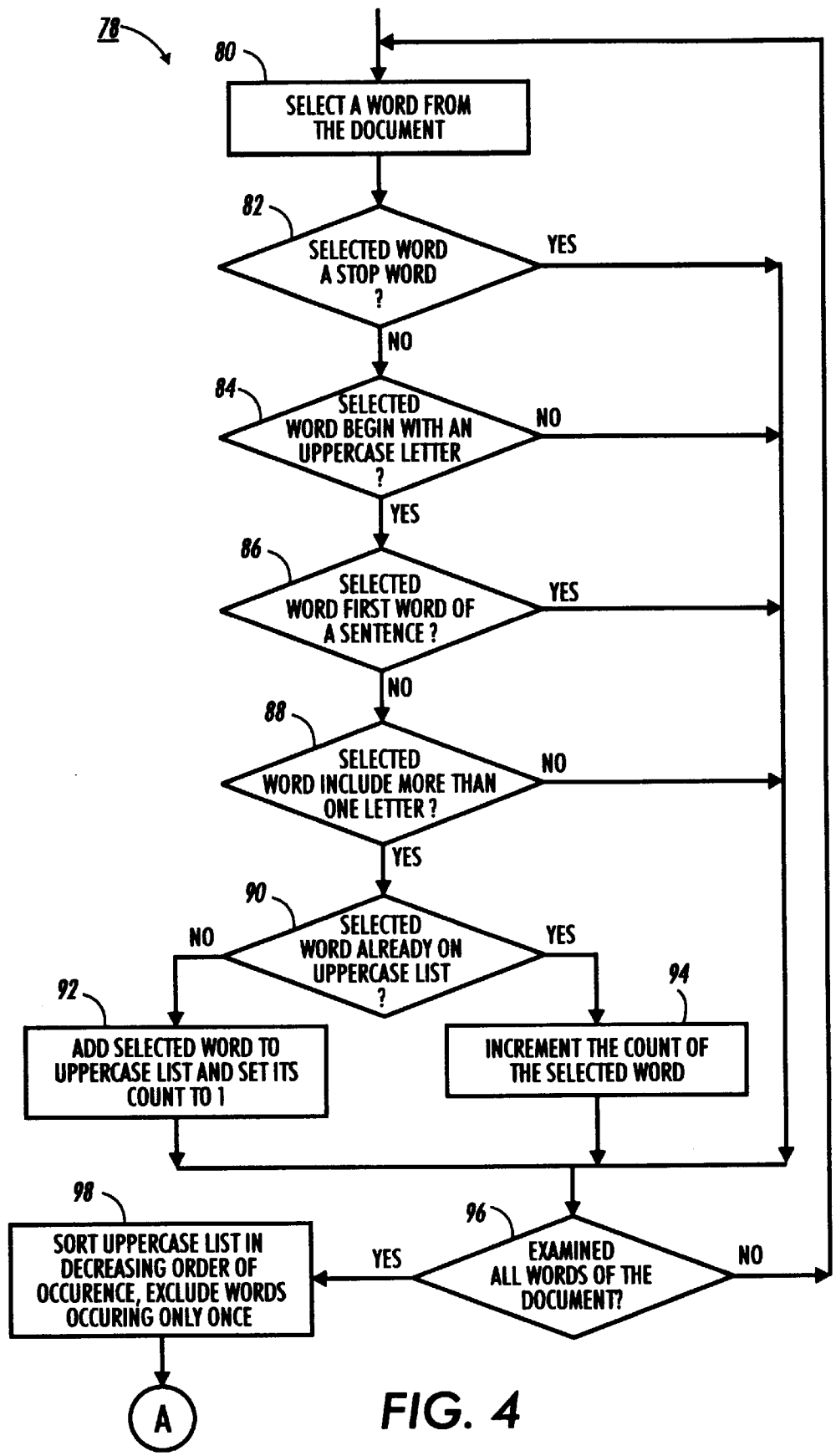
FIG. 4 is a flow diagram of a method of identifying upper case sentences within a document.
Figure 4:
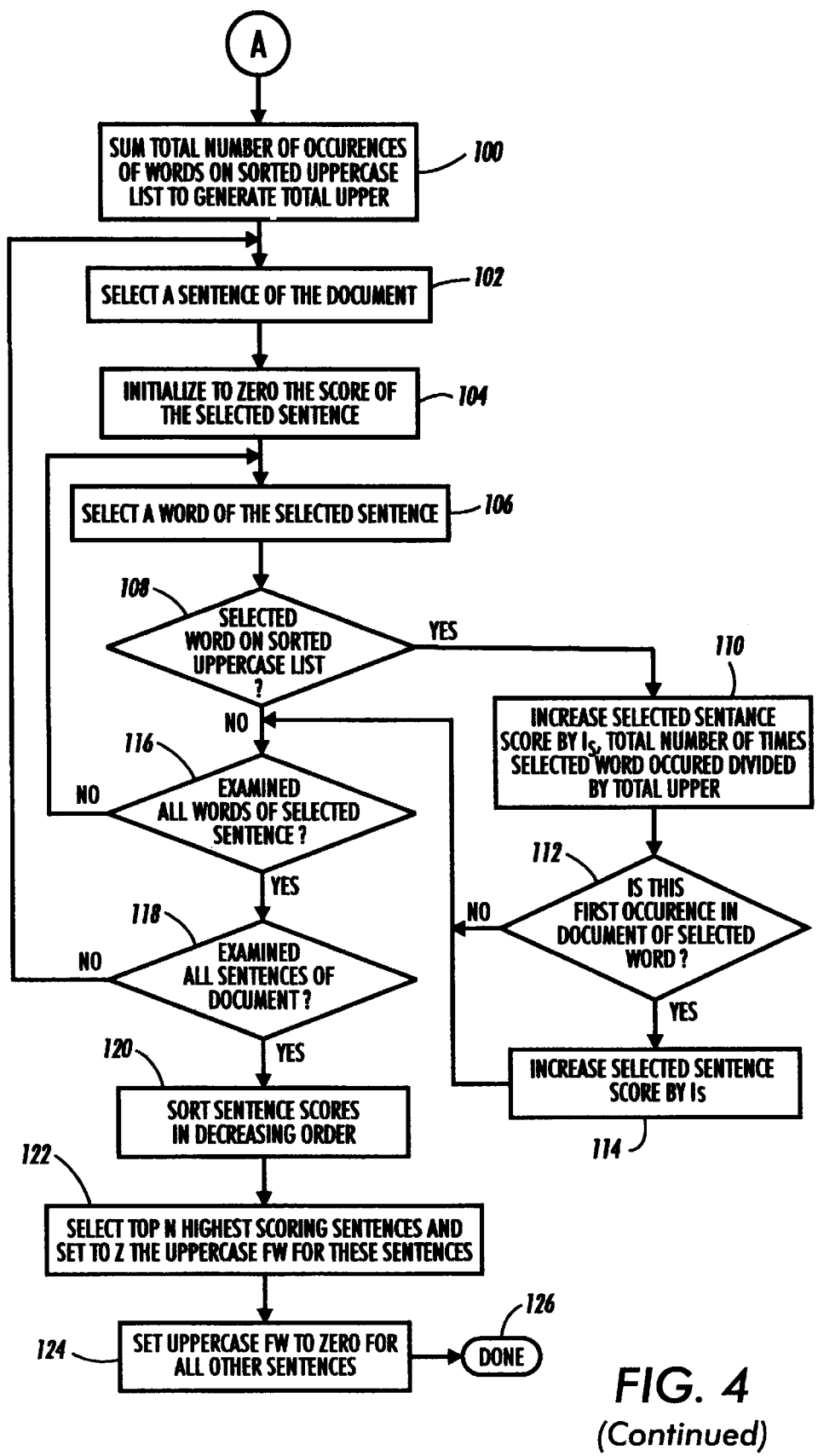

FIG. 4 illustrates in flow diagram form the instructions 78 executed by processor 11 to evaluate the upper case feature for each sentence of a document, regardless of whether evaluation is performed during training or extracting summarization. Instructions 78 may be stored in machine readable form in solid state memory 25 or on a floppy disk placed within floppy disk drive 22. Instructions 78 may be realized in any computer language, including LISP and C++.

Evaluation of the upper case feature resembles evaluation of the direct theme feature. First, during steps 80–98, processor 11 identifies the upper case words within the document. Next, during steps 100–120, processor 11 generates a score for each sentence of the document based upon inclusion of the previously identified upper case words. Finally, during steps 120 and 122, processor 11 selects as the upper case sentences a subset of the highest scoring sentences. For these sentences the upper case feature will be set to true. The upper case feature for all other sentences of the document will be set to false.

Processor 11 begins evaluation of the upper case features of a document with step 80, after a document in machine readable form has been selected and tokenized. During step 80 processor 11 selects a word from the document. Processor 11 then advances to step 82 from step 80, and begins the process of identifying acceptable upper case words. During step 82 processor 11 determines whether the selected word is a stop word. Stop words are unlikely to be associated with acronyms or proper names. If the selected word is not a stop word, processor 11 proceeds to step 84. During that step processor 11 determines whether the selected word begins with an upper case letter by examining its ASCII representation. If it begins with an upper case letter, there is the possibility that the selected word represents a proper name or acronym. Processor 11 responds to this possibility by branching to step 86. During step 86 processor 11 determines whether the selected word is the first word of the sentence. If the selected word is not the first word of the sentence, then selected word may be a proper name or acronym. Processor 11 exits step 86, advances to step 88 and puts the selected word to one last test. During step 88 processor 11 determines whether the selected word includes more than one letter. If it includes more than one letter, processor 11 treats the selected word as an acceptable upper case word during steps subsequent to step 88.

During step 90 processor 11 determines whether the selected word is already listed on the upper case list. If it is not, processor 11 adds the selected word to the upper case list and sets the count to one for that word during step 92. On the other hand, if the selected word is already on the upper case list, during step 94 processor 11 simply increases the count associated with the selected word on the upper case list. That done processor 11 branches to step 96 to continue its evaluation of the words of the document. Processor 11 executes steps 80, 82, 84, 86, 88, 90, 92, 94, and 96 until every word of the selected document has been evaluated. When every word of the document has been evaluated, processor 11 advances to step 98 from step 96.

Processor 11 begins preparations to score each sentence of the selected document during step step 98. First, processor 11 ranks the words in the upper case list, words with greater counts having a higher ranking than words with lesser counts. Processor 11 does not rank infrequent upper case words. In the preferred embodiment, an upper case word is considered infrequent if it occurs only once within the document. During step 100 processor 11 uses the ranking of words on the upper case list to determine the total number of occurrences of frequent upper case words, denoted Total Upper. Having done that, processor 11 is ready to begin scoring each sentence of the document and branches to step 102.

During step 102 processor 11 selects a sentence to score. Processor 11 will examine the selected sentence a word at a time during the subsequent steps. First, during step 104 processor 11 initializes the score for the sentence to zero. Afterward, during step 106 processor 11 selects one of the words of the selected sentence. Processor 11 determines during step 108 whether the selected word is a frequent upper case word. If so, processor 11 advances to step 110 from step 108. During step 110 processor 11 increments the score of the selected sentence by an amount proportional to the frequency of the selected upper case word. Preferably, processor 11 increments the sentence score by $I_s$, where $I_s$ is given by the expression:

$$I_s = \frac{\text{Count of selected upper case word in the selected sentence}}{\text{Total upper}}$$

Subsequently, during steps 112 and 114 processor 11 further increases the score of the selected sentence if this is the first occurrence of the selected word within the document. Afterward, processor 11 advances to step 116 and continues examination of the words of the selected sentence by executing steps 106, 108, 110, 112, and 114 until each word of the selected sentence has been examined. When that occurs, processor 11 branches to step 118 from step 116. With step 118 processor 11 turns its attention to the scoring of another sentence of the document, if possible. Processor 11 executes steps 102, 104, 106, 108, 110, 112, 114, and 116 until every sentence of the selected document has been scored. When that occurs, processor 11 branches to step 120.

During step 120 processor 11 ranks sentence scores, higher scoring sentences having a higher ranking. Processor 11 uses this ranking of sentences during step 122 to select as upper case sentences a subset of the highest scoring sentences. In the preferred embodiment, fifteen sentences are selected as upper case sentences. Afterward, during step 124 processor 11 sets to true the upper case feature value for the upper case sentences. Processor 11 sets to false the upper case feature for all other sentences of the document.

B.4. Reducing Feature Evaluation Time

For those systems in which memory space is an issue, feature can be performed in a way that does not require that the full document be stored in memory. Three features, cue words, location, and sentence length, can be evaluated given just a sentence. Thus, the values for these three features can be evaluated during a single pass through a document as will be obvious to one of ordinary skill in the art. In contrast to the three previously mentioned features, both the direct theme feature and uppercase feature cannot be evaluated simply given a sentence. Both require knowledge of document wide characteristics to determine their value for a particular sentence. Nonetheless, processing time can be reduced by gathering document wide information for both features during a single pass of a document. That is to say, both the term index needed for the direct theme feature and the upper case list can be generated during a single pass of a document. Altering instructions 40 and 78 to do will be obvious to one of ordinary skill in the art given the similarity between steps 42–47 of instructions 40 and steps 80–96 of instructions 78.

III. Method of Training to Generate Feature Probabilities

Employing a statistical approach, processor 11 generates feature probabilities from a corpus of training documents and an associated corpus of short summaries, one for each document. Generating feature probabilities requires evaluating the features of each summary sentence. Some feature values cannot be determined, or determined accurately, from the summary alone. For example, a summary sentence's location feature value cannot be determined given just the summary. Further, some feature values may not be accurately determined using just summary sentences because some summary sentences are concatenations and modifications of original sentences. Thus, the presence of cue words in a summary sentence may not mean that an original sentence also included the cue words. Consequently, evaluation of the features of each summary sentence requires identifying a matching sentence within the summary's associated document. This must be done before training begins.

A. Matching Summary Sentences with Document Sentences

Figure 5:
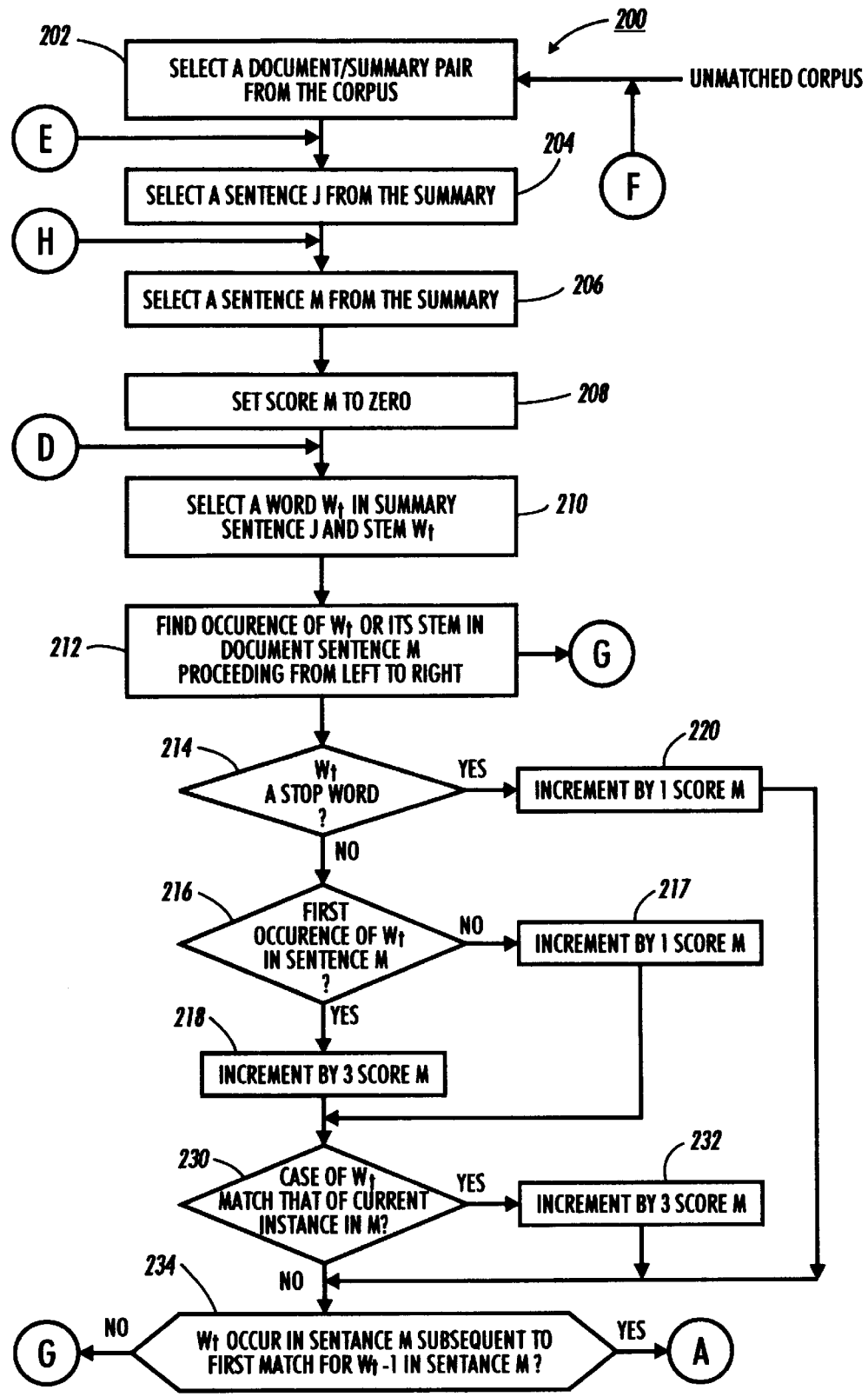
FIG. 5 is a flow diagram of a method of locating sentences within a document that match sentences within a manually generated summary for that document.
Figure 5:
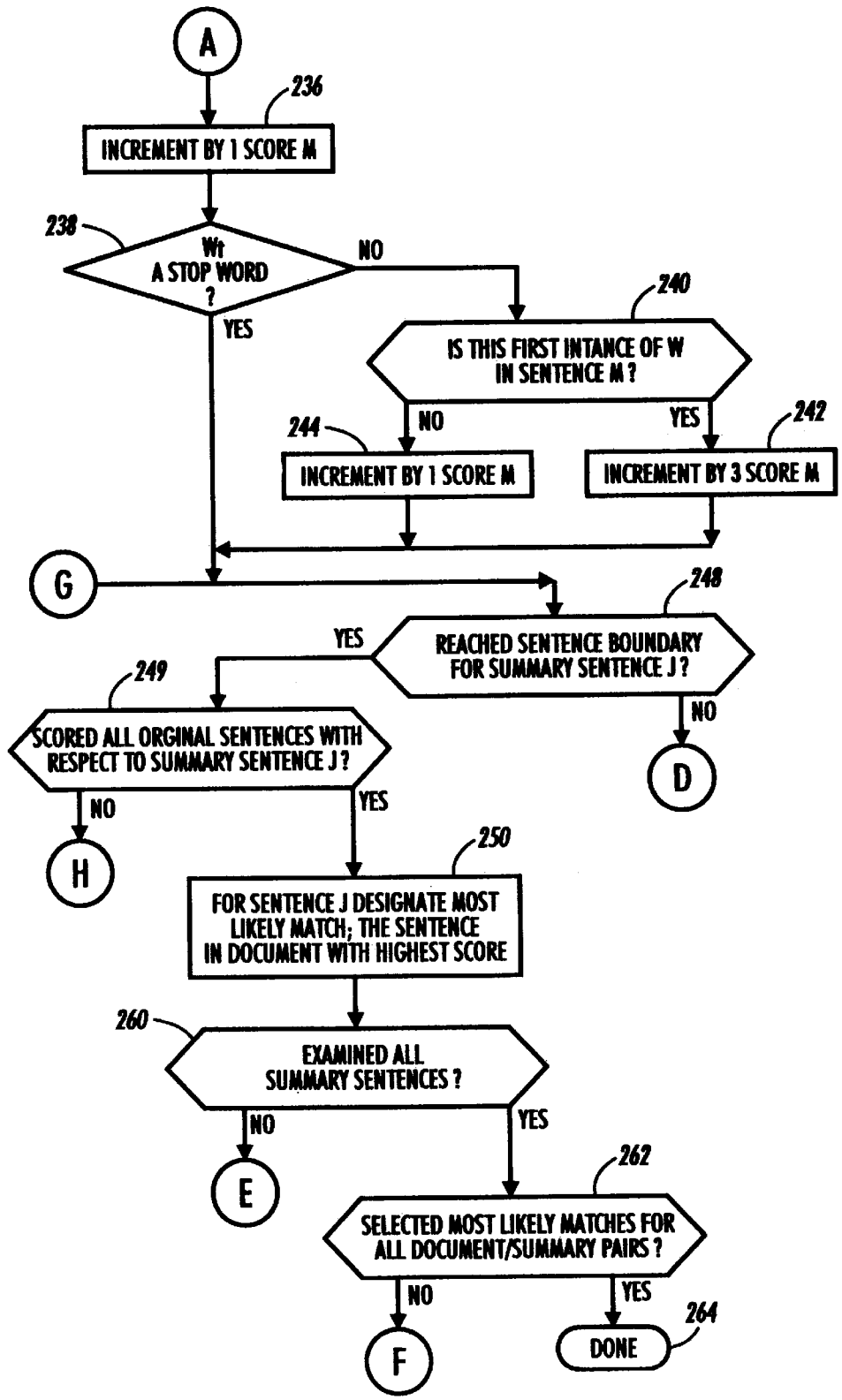

FIG. 5 illustrates in flow diagram form instructions 200 executed by processor 11 to identify matching sentences within a document for each sentence of an associated manually generated summary. Given instructions 200 and a document-summary pair, processor 11 identifies the matching sentences within the document. Processor 11 does so by scoring each original sentence based upon inclusion of words from the summary sentence, capitalization of words common to both sentences, and upon the order of words common to both sentences. Instructions 200 may be stored in machine readable form in solid state memory 25 or on a floppy disk placed within floppy disk drive 22. Instructions 40 may be realized in any computer language, including LISP and C++.

Briefly described, instructions 200 identifies document sentences that may match manually generated summary sentences a summary sentence at a time. After selecting a summary sentence to be matched, processor 11 scores each document sentence of the related document with respect to the selected summary sentence. Processor 11 scores document sentences during steps 208–246 based upon commonality of words, similar word order, and similar capitalization. Afterward, during step 250 processor 11 identifies as possible matches for the selected summary sentence a subset of the highest scoring document sentences.

Given that brief description, we turn now to a detailed explanation of instructions 200. Execution of instructions 200 is initiated by identification and selection of the corpus of training documents and their associated manually generated summaries, all of which are in machine readable form. Upon initiation, processor 11 advances to step 202 and selects one document and its associated summary. Afterward, during step 204 processor 11 selects a summary sentence, the selected summary sentence, whose match is to be identified. Next, processor 11 selects an original sentence, the selected document sentence, to compare to the selected summary sentence. Processor 11 then exits step 206, advances to step 208, and performs an additional task prior to beginning evaluation of the selected document sentence. During step 208 processor 11 initializes to zero the score for the selected document sentence. Processor 11 branches to step 210 from step 208.

During step 210 processor 11 selects in order one of the words of the selected summary sentence and designates it the selected summary word, $w_t$. Processor 11 then advances to step 212 to search for the selected summary word within the selected document sentence. If the selected document sentence does not include the selected summary word, processor 11 branches from step 212 to step 248. Discussion of subsequent events in this situation will be deferred until later. On the other hand, if the selected document sentence includes the selected summary word, upon its first occurrence, processor 11 advances to step 214 from step 212.

Discovery of the selected summary word within the selected document sentence means processor 11 will increase the score of the selected document sentence. How much processor 11 increases that score for the mere presence of the selected summary depends on the answers to two questions:

1. Is the selected summary word a stop word? and
2. Is this the first occurrence of the selected summary word in the selected document sentence?

During step 214, processor 11 answers the first question by determining whether the selected summary word is a stop word. If so, during step 220 processor 11 increases the score for the selected document sentence by some amount, preferably one. Processor 11 then exits step 220 and advances to step 234. Actions during step 234 and subsequently will be deferred until later. On the other hand, if the selected summary word is not a stop word, processor 11 branches from step 214 to step 216. During step 216 considers the second question effecting the amount by which the score should be increased. Processor 11 determines during step 216 whether the current occurrence of the selected summary word is its first occurrence within the selected document sentence. If so, processor 11 increases the sentence score by some amount, preferably 3, during step 218. Afterward, processor 11 advances to step 230. On the other hand, if the current occurrence is not the first occurrence of the selected summary word within the selected document sentence, then processor 11 only increases the sentence score by some amount less than that of step 218, preferably by one, during step 217. Processor 11 then proceeds to step 230.

During step 230 processor 11 determines whether within the selected document sentence the capitalization of the selected summary word matches its capitalization within the selected summary sentence. If so, processor 11 advances to step 232 and increases the score for the selected document sentence by some amount, preferably 3. Afterward, processor 11 branches from step 232 to step 234. Processor 11 advances directly to step 234 from step 230 when the capitalization of the selected summary word is not the same within the selected summary sentence and the selected document sentence.

During step 234 processor 11 considers word order as an indicator of similarity between the selected summary sentence and the selected document sentence. Processor 11 determines whether the selected summary word occurs in the selected document sentence subsequent to the occurrence of the previously selected summary word, $w_{t-1}$. If $w_t$ does not occur in the selected document sentence after the occurrence therein of
$w_{t-1}$, then processor 11 will not further increase the score of the selected document sentence based upon the current occurrence of the selected summary word in the selected document sentence. To illustrate, assume the following circumstances:

| Selected summary sentence: | Said the cat, "Hat, schmat!" |
| --- | --- |
| $W_{t-1}$: cat | |
| $W_t$: hat | |
| Selected document sentence: | The hat resembled a cat. |

In this example, $w_t$, "hat," does not occur in the selected document sentence after $w_{t-1}$, "cat," as it does in the selected summary sentence. When the previously selected summary word does not precede the currently selected summary word within the selected document sentence, processor 11 exits step 234. Scoring of the selected document sentence based upon the selected summary word is through. In response, processor 11 advances to step 248, discussion of which will be briefly deferred. On the other hand, if the selected summary word occurs in the selected document sentence after the previously selected summary word, then further increases to the score of the selected document sentence based upon the current occurrence of the selected summary word are justified. In that case, processor 11 advances to step 236 from step 234.

During step 236 processor 11 increases the score of the selected document sentence by some amount, preferably 1, for having satisfied the word order test. Processor 11 then advances to step 238 to investigate whether further increases are justified.

Processor 11 considers further increases of the score unjustified if the selected summary word is a stop word because stop words are not as indicative of content common to the selected document sentence and the selected summary sentence. Upon discovery that the selected summary word is a stop word, processor 11 exits step 238 and advances to step 248. Discussion of activities during step 248 will be briefly deferred. Conversely, processor 11 considers further increases to the score of the selected document sentence justified when the selected summary word is not a stop word. In this situation, processor 11 branches to step 240 from step 238 to determine how great an increase should be made. During step processor 11 determines whether the current occurrence of the selected summary word in the selected document sentence is the first occurrence. If so, processor 11 advances to step 242 and increases the score by some amount, preferably three. Afterward, processor 11 advances to step 248. On the other hand, if the current occurrence of the selected summary word is not the first occurrence, then processor 11 branches to step 244 from step 240. Processor 11 increases the score by an amount, preferably one, during step 244. Afterward, processor 11 advances to step 248 from step 244.

During step 248 processor 11 determines whether it has completed scoring the selected document sentence with respect to the selected summary sentence. If processor 11 has not yet encountered the boundary of the selected summary sentence, then scoring of the selected document sentence is not complete. Processor 11 responds to this situation by branching to step 210 from step 248. With step 248 processor 11 continues its scoring of the selected document sentence by selecting another word of the selected summary sentence. Eventually, processor 11 discovers during step 248 that it has searched for each word of the selected summary sentence within the selected document sentence. This indicates completion of the scoring of the selected document sentence with respect to the selected summary sentence. When that occurs, processor 11 branches from step 248 to step 249.

Processor 11 determines during step 249 whether it has completed scoring the original sentences with respect to the selected summary sentence. If not, processor 11 returns to step 206 and designates another original sentence as the selected document sentence. Scoring proceeds from step 206 in the manner previously discussed. Once every document sentence has been scored processor 11 can select a document sentence matching the summary sentence. To do so, processor 11 branches from step 249 to step 250.

Processor 11 selects a subset of the original sentences of the document as possible matches for the selected summary sentence during step 250. Processor 11 selects the subset based upon those original sentences having the highest scores with respect to the selected summary sentence. Preferably, processor 11 designates more than one original sentence as a possible match because the possibility exists that the highest scoring sentence may not be a good match for the selected summary sentence.

Having selected the subset of possibly matching sentences, processor 11 exist step 250 and proceeds to step 260.

During step 260 processor 11 determines whether it has selected matching original sentences for each sentence of the summary. If not, processor 11 returns to step 204 to begin the process of identifying a matching original sentence for another summary sentence of the selected summary. On the other hand, if a match has been found for every sentence of the selected summary, processor 11 advances to step 262. Processor 11 determines whether it has found matching sentences for every summary of the corpus during step 262. If not, processor 11 branches back to step 202 and begins the process again for another document summary pair of the training corpus. However, if matches for the entire corpus have been identified, processor 11 exits step 262 and advances to step 264, its current task complete.

Given identification of multiple possible matching sentences for each summary sentence using instructions 200, matching document sentences can be, and preferably are, manually selected. Final manual selection of matching document sentences is desirable for two reasons. First, it allows identification of summary sentences for which no matching document sentence exists. A summary sentence may not have a matching document sentence because it was constructed by the expert generating the summary. Second, manual selection of matching sentences is helpful when a summary sentence is the product of two joined document sentences, only of which will be designated as the matching sentence.

B. Training to Generate Feature Probabilities

Training determines feature probabilities that can be used later to automatically extract from a document the same set of sentences that an expert might select for a summary. Training requires a feature set and a matched training corpus. Both the preferred feature set and a method of matching a training corpus are described in detail above. Given these prerequisites, during training processor 11 evaluates each feature individually for each sentence within the training set and counts the number of times each feature takes each of its possible values within all sentences, as well within sentences matching summary sentences. Processor 11 uses these counts to determine two kinds of probabilities:

1. The probability of observing a value of a feature j in a sentence s included in the summary S, $P(F_j|s \in S)$; and
2. The probability of feature j taking the observed value, $P(F_j)$.

Figure 6:
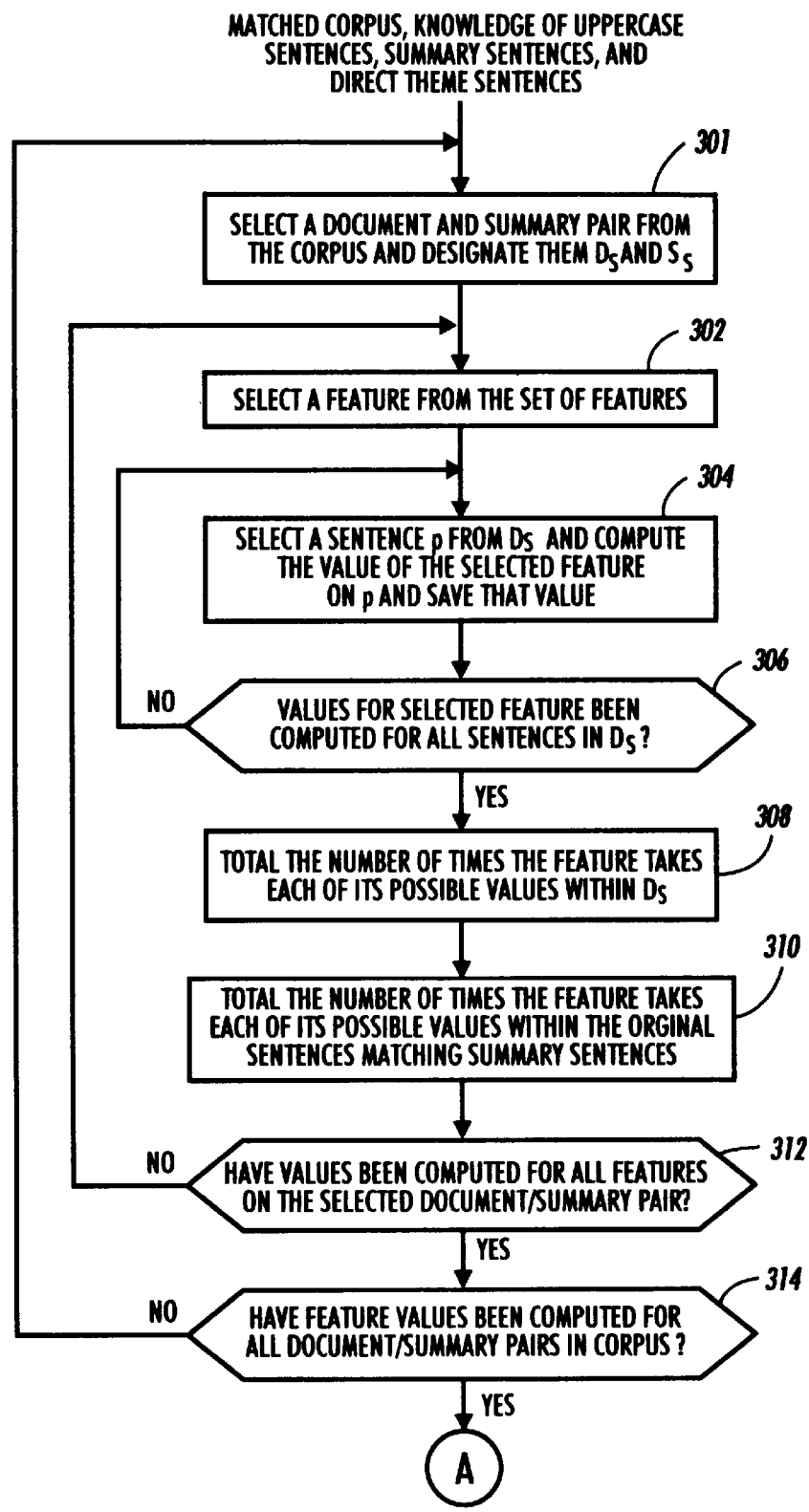
FIG. 6 is a flow diagram of a method of generating feature probabilities given a corpus of documents.
Figure 6:
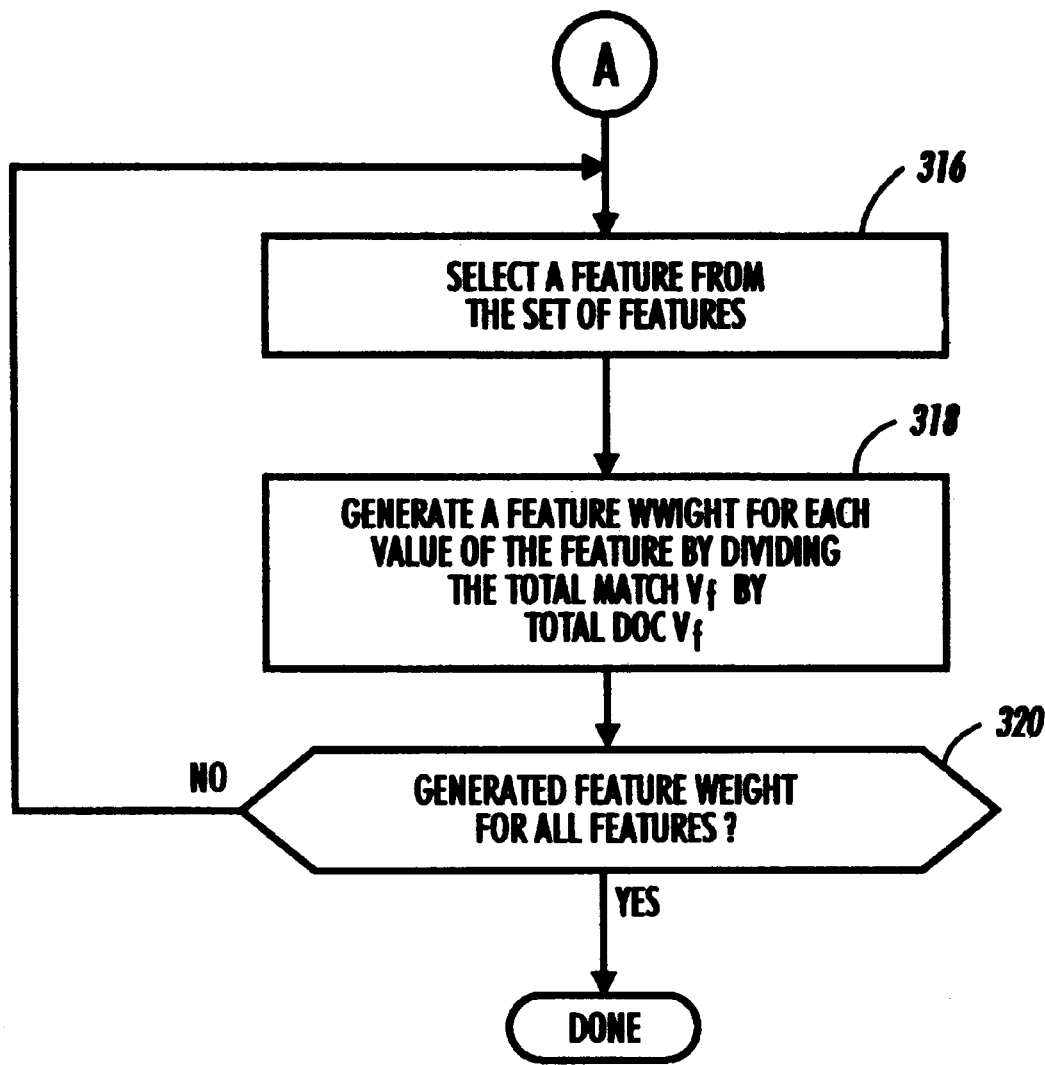

FIG. 6 illustrates in flow diagram form instructions 300 executed by processor 11 to determine the required probabilities from the matched training corpus. Instructions 300 may be stored in machine readable form in solid state memory 25 or on a floppy disk placed within floppy disk drive 22. Instructions 300 may be realized in any computer language, including LISP and C++.

Processor 11 begins execution of instructions 300 with step 301. During that step processor 11 designates a document of the corpus as the selected document, $D_s$. During subsequent steps processor 11 will determine the values of the features for all sentences of $D_s$ including those document sentences that match summary sentences. That done, processor 11 advances to step 302 and selects a feature to evaluate, the selected feature, $F_s$. The following discussion assumes that values for each feature are evaluated separately; however, it is possible to evaluate the values for all features at the same time given appropriate data structures. Both methods of determining feature values are consistent with the present invention. Processor 11 branches from step 302 to step 304.

During step 304 processor 11 selects a sentence from the selected document and determines the value of the selected feature for that sentence. Processor 11 associates that value with the selected sentence. Processor 11 next determines during step 306 whether values for the selected feature have been determined for all sentences of the selected document. Processor 11 branches back to step 304 from step 306 until the value of the selected feature has been determined for every sentence of the selected document. When every sentence has been evaluated, processor 11 advances to step 308 from step 306.

During step 308 processor 11 determines the number of times the selected feature took each of its possible values for all sentences within the document. For example, if $F_s$ is a feature which takes only the values true and false, then processor 11 determines the number of sentences within the selected document in which $F_s$ is true, t, and the number of times $F_s$ is false, f. Let us denote these quantities generally by "$DocN_{FV}$" to indicate that it represents the number of times, N, within a single document that a feature, F, takes a particular value, V. Thus, if the selected feature can take two values, true and false, then during step 308 processor 11 will calculate two quantities, $DocN_{FT}$ and $DocN_{FF}$. During step 308 processor 11 adds the values for the document to running totals for the training corpus, denoted generally as $TotalDocN_{FV}$. Subsequently, processor 11 advances to step 310 to perform a similar task.

During step 310 processor 11 determines the number of times $F_s$ takes each of its possible values within the matching original sentences of $D_s$. Let us represent these quantities generally as "MatchN$_{FV}$." The values for this particular document are then added to the running totals, denoted "TotalMatchN$_{FV}$." Evaluation of the selected feature complete, processor 11 exits step 310 and advances to step 312.

Processor 11 determines during step 312 whether it has determined all feature values for the selected document. If processor 11 has not yet evaluated all features, then processor 11 returns to step 302 from step 312. Processor 11 then executes steps 302, 304, 306, 308, 310, and 312 in the manner just described until the feature values for each feature have been determined. When evaluation of the selected document is complete, processor 11 exits step 312 and branches to step 314.

Processor 11 determines during step 314 whether feature values have been computed for every document within the training corpus. If not, processor 11 return to step 301 and executes step 301, 302, 304, 306, 308, 310, 312, and 314 in the manner just described until all feature values have been computed for every document in the training corpus. When that occurs, processor 11 is ready to compute feature probabilities and advances to step 316 from step 314.

Calculation of feature probabilities begins in step 316 with the selection of one feature from the selected set of features to be used to generate. Subsequently, during step 318 processor 11 calculates the probabilities associated with each value of the selected feature. Processor 11 does so by dividing the total number of times that matching sentences took a particular feature value, TotalMatch$_{FV}$, by the total number of times that sentences within the training corpus took that same feature value, TotalDoc$_{FV}$. The number of probabilities calculated for a feature during step 318 is equal to the number of values that feature is capable of taking. After calculating all probabilities associated with the selected feature, processor 11 branches from step 318 to step 320.

Processor 11 decides during step 320 whether it has calculated probabilities for all of the features. If not, processor 11 returns to step 316 and repeats steps 316, 318, and 320 until all feature probabilities have been calculated. When that occurs, processor 11 branches from step 320 to step 324, training complete. Subsequently processor 11 can use these feature probabilities to automatically generate document summaries of comparable quality to manually generated summaries.

IV. Method of Automatically Extracting Summary Sentences

Figure 7:
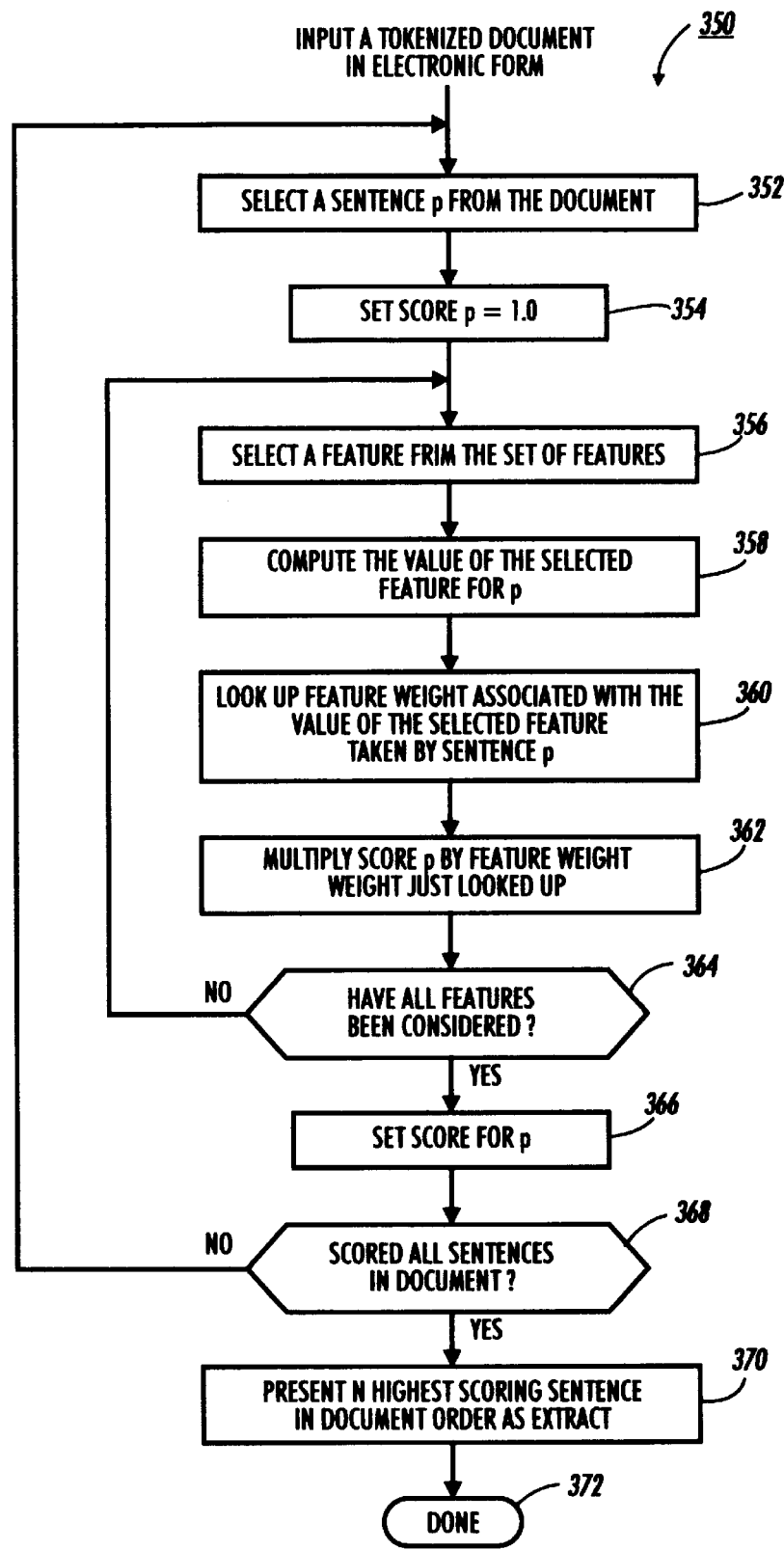
FIG. 7 is a flow diagram of a method of automatically generating an extract for a machine readable representation of a natural language document using multiple features and feature probabilities.

FIG. 7 illustrates in flow diagram form instructions 350 used by processor 11 to automatically extract the same set of sentences from a document that an expert might. Instructions 350 may be stored in machine readable form in solid state memory 25 or on a floppy disk placed within floppy disk drive 22. Instructions 350 may be realized in any computer language, including LISP and C++.

Briefly described, instructions 350 directs the selection of sentences to be extracted from a machine readable document based upon sentence scores, which are the product of probabilities provided by each feature evaluated individually on each sentence. After scoring each sentence of the document, processor 11 extracts the highest scoring sentences and presents them to the computer user as the document extract.

Given that brief description, now consider FIG. 7 in detail. Execution of instructions 350 begins when the computer user indicates a document in machine readable form for which an extract should be generated. In response to selection of a particular document, processor 11 branches to step 352 and selects a sentence from the selected document. Afterward, processor 11 advances to step 354 and initializes the score for the selected sentence to some non-zero number, preferably one. Processor 11 then branches to step 356 from step 354.

With step 356 processor 11 begins the process of determining the suitability of the selected sentence for inclusion in an extract of the selected document. Processor 11 begins this process by selecting a feature for evaluation from the set of features during step 356. Processor 11 then determines the value of the feature for selected sentence during step 358. Processor 11 then proceeds to step 360. Given the feature value, processor 11 looks up the probability associated with it, during step 360. Next, during step 362 processor 11 modifies the score for the selected sentence by an amount proportional to the probability just looked up. In the preferred embodiment, during step 362 processor 11 simply multiplies the score for the selected sentence by the probability identified during step 360.

Having completed the evaluation of one feature, processor 11 determines during step 364 whether all the values of all features for the selected sentence have been determined. If not, processor 11 has not completed its scoring of the selected sentence. In that case, processor 11 returns to step 356 from step 364 and executes steps 356, 358, 360, 362, and 364, until the score of the selected sentence has been adjusted to reflect the values of all features. When processor 11 completes the scoring of the selected sentence, processor 11 exits step 364 and branches to step 366.

During step 366 processor 11 stores the final score for the selected sentence for future reference. Having completed the scoring of one sentence, processor 11 determines during subsequent step 368 whether it has scored each sentence of the selected document. If not, processor 11 returns to step 352 and selects another sentence from the selected document for evaluation. Processor 11 executes steps 352, 354, 356, 358, 360, 362, 364, 366, and 368 until it has generated a final score for each sentence of the selected document. When processor 11 determines that it has scored all sentences, processor 11 advances to step 370 from step 368.

Processor 11 selects a subset of the highest scoring sentences to form the document extract during step 370. In the preferred embodiment, the number of sentences included in the extract can be adjusted by the user from a default value. Preferably, the default length of the extract is five sentences. Having selected the sentences to be extracted, processor 11 may present the extract to the user via monitor 12 or printer 13, as well as storing the thematic summary in memory 22 or to floppy disk for later use. Preferably, the extracted sentences are presented in order of their occurrence within the document and are not presented in paragraph form. Presentation of each sentence individually is preferred because the extracted sentences may not logically form a paragraph.

The method just described is particularly useful for previewing long documents. Preferably, an extract would be automatically generated and presented to the user for any document greater than some arbitrary, user specified length, a page for example.

FIGS. 8, 9, and 10 give some indication of the performance of the automatic extracting summarizer just described. FIGS. 8 is a manually generated summary for a document, relevant paragraphs of which are shown in FIG. 9. FIG. 10 shows the sentences extracted from the document using the methods described herein.

V. Evaluation of the Method of Extracting Summary Sentences

The methods just described were applied to a training corpus provided by Engineering Information (the EI corpus). The EI corpus included 188 document-summary pairs, sampled from 21 publications in the scientific/technical domain. No document summary was provided by the document's author. Instead, each summary was created by a professional abstracter after reading a document. The summaries are mainly indicative, and have an average length of three sentences.

The size of the EI corpus did not permit reservation of a separate test corpus for evaluation. For this reason, a cross-validation strategy was used to evaluate the performance of the extracting summarizer just described. Documents from a given journal were selected for testing one at a time; all other documents were used for training. Results were summed over journals. Unmatchable and incomplete sentences were excluded from both training and testing. Performance was evaluated two ways:

1. The fraction of manual summary sentences faithfully reproduced; and
2. The fraction of manual summary sentences correctly identified by the summarizer.

The fraction of manual summary sentences faithfully reproduced is a stringent measure of summarizer performance because it is limited by the sum of all direct matches and all direct joins. For the EI corpus the maximum obtainable by this measure was 83%. Given the assumption that there is only one correct match for each manual summary sentence, the extracting summarizer faithfully reproduced 35% of the manual summary sentences when given the number of summary sentences.

The second measure of summarizer performance, the fraction of summary sentences correctly identified, can theoretically reach 100%. For the EI corpus 42% of the document sentences extracted using the methods described matched a manual summary sentence.

As stated previously, the performance of the methods described varies as features are combined together. For the EI corpus the combination of the location, cue word and sentence length features yielded the best performance. Using the direct theme and upper case features slightly decreased performance. Despite this, use of all five features is preferable because many document genres do not conform with the conventions and structure of the scientific/technical abstracts of the EI corpus.

VI. Conclusion

A method of automatically generating document extracts using a computer system has been described. The method makes use of feature value probabilities generated from a statistical analysis of manually generated summaries to extract the same set of sentences an expert might. The method is based upon an iterative approach using a computer system to select sentences for extraction. First, the computer system designates a sentence of the document as a selected sentence. Second, the computer system determine values for the selected sentence of each feature of a feature set. Third, the computer system increases a score for the selected sentence based upon the value of the feature for the selected sentence and upon the probability associated with that value. Fourth, after scoring all of the sentences of the document the computer system, the computer system selects a subset of the highest scoring sentences to be extracted.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A processor implemented method of automatically extracting a subset of sentences from sentences of a natural language document presented in machine readable form to the processor, the document including a second multiplicity of sentences, the processor being coupled to a memory storing machine readable instructions for extracting sentences, the method comprising the steps of:

a) designating a sentence of the document as a selected sentence;

b) determining values for the selected sentence of each feature of a feature set, the feature set including a location feature and an upper case feature, the location feature having a first location value, a second location value, and a third location value, the first location value indicating that the selected sentence is included within a beginning portion of the document, the second location value indicating that the selected sentence is included within a middle portion of the document, and the third location value indicating that the selected sentence is included within an ending portion of the document, the upper case feature having a first upper case value and a second upper case value, the first upper case value indicating that selected sentence does not include any of a multiplicity of selected upper case phrases, the second upper case value indicating the selected sentence includes a one of the selected upper case phrases;

c) for each feature increasing a score for the selected sentence based upon the value of the feature for the selected sentence and upon a probability associated with the value of the feature;

d) if all sentences of the document have not been designated as the selected sentence, repeating steps a) through c); and e) selecting the subset of sentences to be extracted based upon sentence scores.

2. The method of claim 1 wherein the feature set further comprises a direct theme feature, the direct theme feature having a first value indicating that the selected sentence represents a theme of the document, the direct theme feature having a second value indicating that the selected sentence does not represent a theme of the document.

3. The method of claim 1 wherein the feature set further comprises a cue word feature, the cue word feature having a first value indicating that the selected sentence summarizes the document, the cue word feature having a second value indicating that the selected sentence does not summarize the document.

4. The method of claim 1 wherein the feature set further comprises a length feature, the length feature having a first value indicating that the selected sentence exceeds a minimum length, and the length feature having a second value indicating that the selected sentence does not exceed the minimum length.

5. The method of claim 2 wherein the feature set further comprises a cue word feature, the cue word feature having a first value indicating that the selected sentence summarizes the document, the cue word feature having a second value indicating that the selected sentence does not summarize the document.

6. The method of claim 5 wherein the feature set further comprises a length feature, the length feature having a first value indicating that the selected sentence exceeds a minimum length, and the length feature having a second value indicating that the selected sentence does not exceed the minimum length.

7. An article of manufacture comprising:

a) a memory;

b) data stored in the memory, the data including a probability for each value of each feature of a feature set, the probabilities being generated from a statistical analysis of a document corpus and an associated corpus of manually generated summaries;

c) instructions stored in the memory, the instructions being accessible for extracting a subset of sentences from sentences of a natural language document in machine readable form, the document including a second multiplicity of sentences, the instructions representing the steps of:

1) designating a sentence of the document as a selected sentence;

2) determining values for the selected sentence of each feature of a feature set, the feature set including a location feature and an upper case feature, the location feature having a first location value, a second location value, and a third location value, the first location value indicating that the selected sentence is included within a beginning portion of the document, the second location value indicating that the selected sentence is included within a middle portion of the document, and the third location value indicating that the selected sentence is included within an ending portion of the document, the upper case feature having a first upper case value and a second upper case value, the first upper case value indicating that the selected sentence does not include any of a multiplicity of selected upper case phrases, the second upper case value indicating that the selected sentence includes a one of the selected upper case phrases;

3) for each feature increasing a score for the selected sentence based upon the value of the feature for the selected sentence and upon a probability associated with the value of the feature;

4) if all sentences of the document have not designated as the selected sentence, repeating steps c1) through c3); and 5) selecting the subset of sentences to be extracted based upon sentence scores.

\* \* \* \* \*